Nov. 8, 1966  G. F. MANGUM ETAL  3,283,510
THROTTLABLE SOLID PROPELLANT ROCKET MOTOR
Filed Aug. 3, 1964
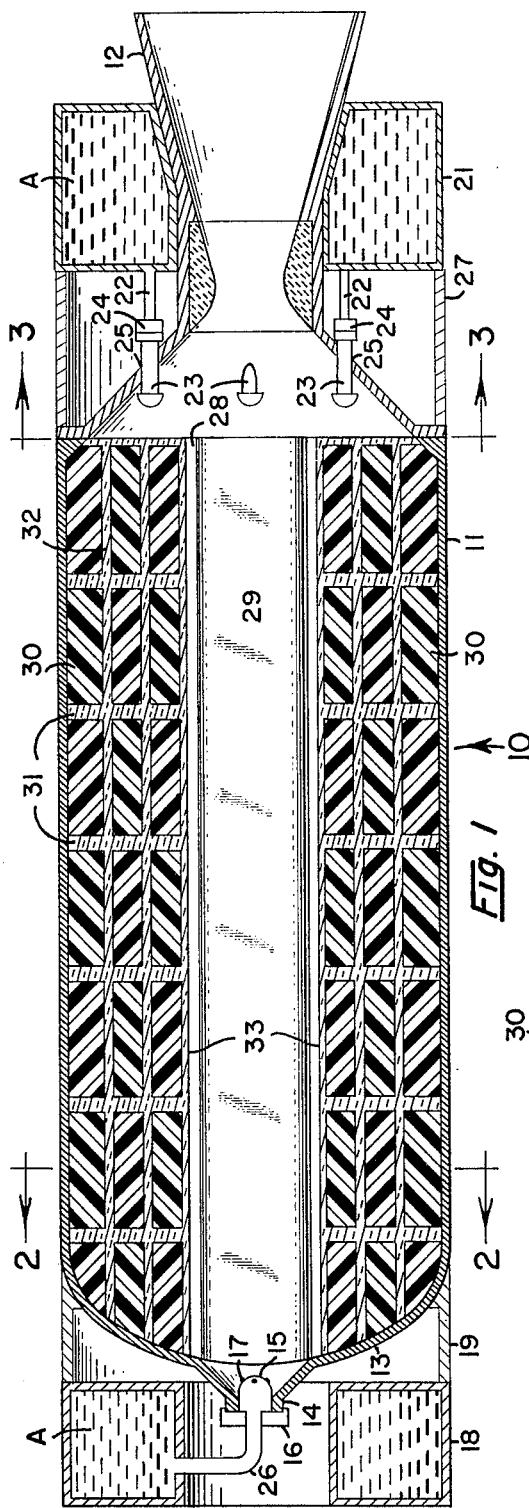
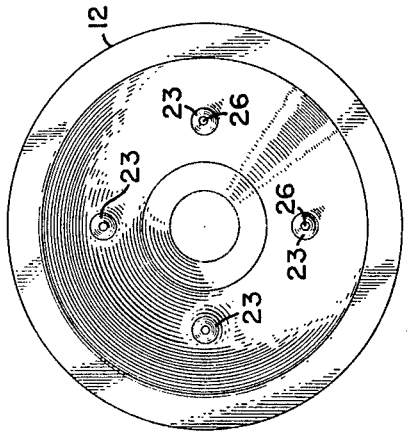
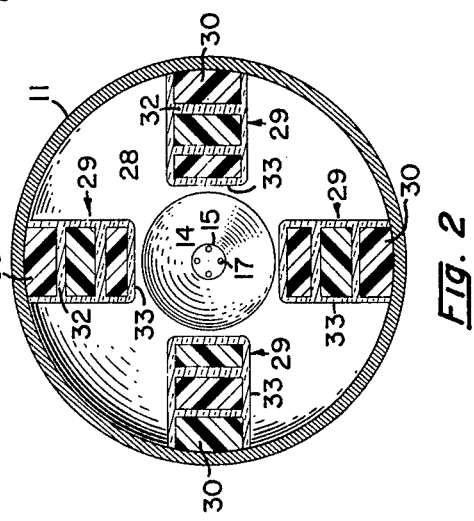
Grafton F. Mangum
Roy T. Willis, Jr INVENTORS
BY *Rott D Williams*
ATTORNEY

United States Patent Office 3,283,510
Patented Nov. 8, 1966

3,283,510
THROTTLABLE SOLID PROPELLANT
ROCKET MOTOR
Grafton F. Mangum and Roy T. Willis, Jr., Huntsville, Ala., assignors to Thiokol Chemical Corporation, Bristol, Pa., a corporation of Delaware
Filed Aug. 3, 1964, Ser. No. 387,069
5 Claims. (Cl. 60—250)

This invention relates to improvements in solid propellant rocket motors that are capable of achieving a wide range of thrust modulation and, more particularly, to the command control of the amount of burning surface of the solid propellant in the rocket motor and providing injector means for feeding into the rocket motor, at command, a hypergolic ignition material that will combust the inhibitors on the burning surfaces of the solid propellant and permit the ignition of the solid propellant to control the thrust characteristics of the rocket motor.

It is a well-known fact that control of the magnitude of the area of the burning surface of a solid propellant can be obtained by restricting certain burning surface areas. The present invention was developed to accomplish this end by applying inhibitor materials on specified areas and providing means for igniting the inhibitor materials to vary the amount of burning surface available at any specified time. Such inhibitor materials will not ignite under ordinary burning of the solid propellant unless an additional element or compound is applied to the inhibitor materials. The introduction of the additional element or compound is controllable at will; and this feature, therefore, assures the element of control of the surface exposed to burning.

The inhibitor materials are applied to the solid propellant so that there is essentially no defect in the bond between the inhibitor materials and the solid propellant; and the inhibitor materials are essentially fully consumable or non-consumable under all environmental temperatures to which the solid propellant may be subjected from the lowest to the highest that meet specific requirements.

It is, therefore, an object of this invention to apply inhibitor materials to specific areas of solid propellant and to provide means for treating such inhibitor materials whereby the burning of the solid propellant may be controlled at command by igniting and burning the inhibitor materials and exposing areas of the solid propellant protected by the inhibitor materials.

There are many types of rocket motors wherein injectors are provided for disbursing within a rocket motor mixes of fuel and oxidizers; but such injection is performed to aid in the combustion of the propellant within the rocket motor. The present invention does not, however, call for injection into the rocket motor mixes to ignite the solid propellant but only mixes that will ignite and destroy the inhibitor materials that have been applied to the solid propellant.

The present invention does not rely on any specific type of injector but does rely on a controllable direction of injection so that the inhibitor materials can be caused to be ignited over selected areas within the rocket motor. The injector, therefore, can be of any conventional type and is, therefore, not restricted to spray, splash, or other similar types of available injectors.

There are also many types of inhibitor materials, and the present invention does not attempt to restrict the inhibitor to a specific form of inhibitor material but is operable with any type of inhibitor material for which a material is available to ignite and burn such inhibitor material.

The invention, while illustrating one form of solid propellant grain that would operate under the desired circumstances, is not limited to that configuration illustrated. Any geometrical configuration is suitable provided the selected configuration can be protected by inhibitor materials and that a passage for the combustion gases to the exhaust nozzle is included. The only additional requirement is that such geometrical configurations be arranged within the rocket motor so that the burning surfaces of the configurations are available for ignition immediately upon the disintegration of the inhibitor materials. The burning surfaces are prearranged for ignition so that upon the ignition thereof the thrust of the rocket motor may be varied from a high to a low thrust or vice versa or a high initial thrust and variations in the thrust to maintain the rocket motor in operation.

The solid propellant does not require a plurality of ignition means to reignite the solid propellant as the inhibitor materials are removed, but depends upon the gases and pressure available within the rocket motor and the destruction of the inhibitor materials to maintain burning of the solid propellant.

Another object of the invention is, therefore, to commit at a suitable command a quantity of solid propellant for combustion in a highly selective manner.

The invention, therefore, contemplates withholding the combustion of the quantity of solid propellant until that combustion is required and then creating such combustion at and by a suitable command. It is also apparent that once committed to combustion, the solid propellant will burn until the next layer of inhibitor material is reached. The unit amount of burning of the solid propellant is determined, therefore, by the configuration of the solid propellant that is defined between the inhibitor materials; and the quantities of solid propellant burned away will depend on the size of the rocket motor and the fineness of modulation of thrust of the rocket motor that is required.

Further objects and advantages that are inherent in the present invention will be apparent to those skilled in the art from the following description when accompanied by the drawing appended thereto in which:

FIGURE 1 is a longitudinal sectional view of a solid propellant rocket motor embodying the invention.

FIGURE 2 is a transverse sectional view on the line 2—2 of FIGURE 1, and

FIGURE 3 is a transverse sectional view on the line 3—3 of FIGURE 1.

Referring more in detail to the drawing wherein like parts are designated by like reference numerals, the reference numeral 10 is used to designate a solid propellant rocket motor embodying the instant invention.

The rocket motor 10 comprises a motor case 11 having an exhaust cone 12 of normal configuration rigidly secured to the aft end thereof in any well-known manner. The case 11 has a closed head end 13 except possibly for an igniter mounting opening 14. However, in the instant invention, an injection head 15 is inserted into the opening 14 and secured therein by means of a fastening means 16. As seen in FIGURE 2, the injection head 15 has four radially-disposed nozzles or jet apertures 17 through which a liquid igniting material A is injected into the interior of the motor case 11.

The igniting material A, which may be any well-known liquid oxidizer, such as Inhibited Red Fuming Nitric Acid, White Fuming Nitric Acid, a fluorine or others as may be listed in the 1959 edition of the "Rocket Encyclopedia," is contained in a substantially doughnut-shaped reservoir 18 that is rigidly secured to the case 11 by means of a support 19, and a supply line or pipe 20 extends from the reservoir 18 to the injection head 15 whereby the igniting material A in the reservoir 18 is fed to the injection head 15.

There is also mounted on the exhaust cone 12 at the aft end of the case 11 a second doughnut-shaped reservoir 21 which also contains a supply of the igniting material A, and the reservoir 21 has four radially-disposed outlet lines or tubes 22 communicating therewith.

Each of the tubes 22 are connected to an injection head 23 by means of a coupling 24, and the injection heads 23 extend into the interior of the exhaust cone 12 by means of four radially-disposed openings 25. Each of the injection heads 23 is provided with a jet aperture 26 whereby the igniting material A in the reservoir 21 is fed into the interior of the case 11. As in the manner of mounting the reservoir 18, a support 27 rigidly secures the reservoir 21 to the case 11.

The main feature of the instant invention resides in the formation of the solid propellant grain within the combustion chamber 28 that is formed by the case 11.

In the form of solid propellant grain illustrated in the drawings, it is shown to comprise four longitudinally-extending, substantially rectangular-shaped formations 29; and each of the formations is comprised of a plurality of blocks 30 which are made of any well-known propellant formulation that contain a binder, fuel and oxidizer such as any of the various polymers of butadiene or the isomers thereof, aluminum, boron, zirconium or others as may be listed in the previously referred to publication, and ammonium perchlorate and hydrazine nitroform, and the blocks are substantially rectangular-shaped in cross-section with the greatest dimension thereof being in parallel relation to the longitudinal axis of the case 11.

The blocks 30, at their shortest dimension, are separated by a layer of inhibiting material 31 which extends transversely of each of the formations 29 and also transversely of the case 11. The blocks 30, at their longest dimension, are separated by a layer of inhibiting material 32 which extends longitudinally of the formation 29 and the case 11; and the exterior outer surface of each of the formations 29 is covered by an outer covering or coating 33. The layers 31, 32 and coating 33 are made of a mixture of carboxyl terminated butadiene aluminum and a burning rate catalyst such as ferrocene or iron oxide, all well-known materials that are used for this purpose.

The blocks 30 are readily available to inspection before being incorporated into the formations 29. Thus any of the blocks 30 that are defective may be eliminated. One example for creating the formation 29 may be as follows: The blocks 30 are precast and molded into the desired shape before they are covered with the inhibitor materials; and after formations 29 have been assembled, as shown in the drawing, they are inserted into the case 11 and case-bonded to the interior surface of the case 11 before the exhaust cone 12 with the support 27 and reservoir 21 secured thereto is secured to the case 11. If any further curing of the formations 29 is desired, the entire case 11 is then subjected to any well-known curing process.

The principal object of the invention is the ability, during the operation of the solid propellant rocket motor, to selectively increase or decrease the burning surface of the solid propellant at command.

The quantity of solid propellant that is to be combusted is determined by the amount of inhibitor material destroyed by injection of the material A onto the material. The injection head 15, by means of the apertures 17 inject the material A onto the longitudinally-extending layers 32 and coating 33 of inhibitor materials; and the injection heads 23, by means of the apertures 26 inject the material A onto the transversely-extending inhibitor layers 31.

Since the blocks 30 and the inhibitor materials are bonded, cemented or vulcanized and then cured together to form a single formation 29, the burning of the inhibitor layers and coating permits the exposure of the burning surfaces of the blocks of the formations 29 in transverse or longitudinal directions as is desired to control the thrust of the rocket motor 10.

As previously stated, the inhibitor layers and coatings are of a normally non-combustible material that may be chemically ignited by the injection thereon of the material A; and when the material A is directed into the case 11 at either the head end or aft end of the case 11, the inhibitor layers and coatings are ignited depending upon the end of the case 11 receiving the material A.

Once the burning surfaces of the blocks 30, that have been exposed by the elimination of the inhibitor materials, have been ignited and have been consumed to the next layer of inhibitor materials and the selected quanity of solid propellant thereby exhausted, the thrust level of the rocket motor will be decreased until the next layer of inhibitor material has been destroyed.

There are many injection systems in use at the present time, and any conventional system may be used whereby force is applied to the material A to permit injection into the case 11. There are also many forms of inhibitor materials that are in use today and there are also many hypergolic materials in use that will ignite and burn such materials.

The composition of the inhibitor materials and the formulations of the material A should be well-known to those skilled in the art, and the instant invention employs such conventional means only in the manner previously described. There are also many command systems available at the present time that may be operated on the rocket itself or operated from a remote distance, and any of such systems that are well-known to those skilled in the art may be used in the instant invention. It is also conceivable to make the blocks 30 of other geometrical configuration and thus the blocks 30 may take other shapes than the one illustrated.

There has, therefore, been provided a rocket motor having provided therein a solid propellant grain that may be composed of blocks of solid propellant of any geometrical configuration with the blocks separated by inhibitor materials of any well-known composition and having means for injecting onto the inhibitor materials a liquid material of any well-known chemical formulation which, by its inherent effect on the inhibitor materials will destroy them to expose the burning surface of the solid propellant whereby certain quantities of the solid propellant may be selectively combusted to control the thrust magnitude of a rocket motor; and, from the foregoing description, the manner of operation and construction of the invention will be clear to those skilled in the art, it also being understood that variations in the manner of operation and construction of the invention may be adhered to providing such variations fall within the spirit of the invention and the scope of the appended claims.

Having thus described the invention, what is claimed as new and desired to be secured by Letters Patent is:

1. In a rocket motor comprising a casing defining a combustion chamber and having an exhaust cone communicating therewith, a solid propellant charge loaded into said chamber; said charge comprising a plurality of formations consisting of blocks of preformed solid propellant separated by layers of inhibiting materials, a coating of inhibiting material covering the surface of each of said formations, means for introducing into said chamber an igniting material that reacts hypergolically with said layers and said coatings to burn said layers and said coatings and ignite said blocks of solid propellant.

2. A rocket motor, as in claim 1, wherein said formations are oriented in the same direction as the longitudinal axis of said casing and said layers and coating of inhibitor materials are oriented in the same direction on the longitudinal axis of said casing as well as transversely of the longitudinal axis of said casing.

3. A rocket motor comprising, in combination, a casing having a combustion chamber, an exhaust cone secured to the aft end of said casing, a solid propellant charge comprising a plurality of geometrical configurations of solid propellant having bonded thereon inhibitor materials, a reservoir means having injection heads communicating therewith and extending into said chamber and an igniting material contained in said reservoir means and adapted to be injected onto said inhibitor materials by said injection heads whereby said igniting material reacts hypergolically with said inhibitor materials to burn said materials and ignite said geometrical configurations of solid propellant.

4. A solid propellant rocket motor comprising, in combination, a casing having a combustion chamber therein and a composite charge of solid propellant in said chamber, the charge comprising a plurality of geometrically-shaped blocks that are bonded to and separated from each other by layers of inhibitors material and reservoirs mounted on said casing and containing therein an ignition material that is adapted to be injected into said chamber to react hypergolically with said layers to burn said layers and ignite said composite charge of solid propellant.

5. A solid propellant as in claim 4, wherein the geometrically shaped blocks are oriented in rows in the same general direction as the longitudinal axis of said casing, as well as transversely thereof, the layers of inhibitor material are interposed between said rows, and a coating for covering said blocks.

References Cited by the Examiner
UNITED STATES PATENTS

| | | | |
|---|---|---|---|
| 2,956,401 | 10/1960 | Kane | 60—35.6 |
| 2,974,484 | 3/1961 | Cooley | 60—39.47 |
| 3,128,600 | 4/1964 | Oldham | 60—35.6 |
| 3,142,959 | 8/1964 | Klein | 60—39.47 X |
| 3,144,751 | 8/1964 | Blackman et al. | 60—35.6 |
| 3,183,665 | 6/1965 | Webb | 60—39.47 X |

MARK NEWMAN, *Primary Examiner.*

CARLTON R. CROYLE, *Examiner.*